United States Patent
Huang et al.

(10) Patent No.: US 10,031,914 B2
(45) Date of Patent: Jul. 24, 2018

(54) MULTIMEDIA EQUIPMENT AND METHOD FOR HANDLING MULTIMEDIA SITUATION

(71) Applicant: HON HAI PRECISION INDUSTRY CO., LTD., New Taipei (TW)

(72) Inventors: Chih-Yuan Huang, New Taipei (TW); Chien-Pan Lai, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 357 days.

(21) Appl. No.: 14/800,941

(22) Filed: Jul. 16, 2015

(65) Prior Publication Data

US 2016/0062996 A1 Mar. 3, 2016

(30) Foreign Application Priority Data

Aug. 26, 2014 (TW) .............................. 103129362 A

(51) Int. Cl.
| H04M 1/72 | (2006.01) |
| G06F 17/30 | (2006.01) |
| H04M 1/725 | (2006.01) |
| H04W 88/02 | (2009.01) |
| H04M 1/02 | (2006.01) |

(52) U.S. Cl.
CPC .... *G06F 17/30047* (2013.01); *H04M 1/0214* (2013.01); *H04M 1/72519* (2013.01); *H04M 1/72522* (2013.01); *H04W 88/02* (2013.01)

(58) Field of Classification Search
CPC ................................................. G06F 17/30047
USPC ........................................................ 707/722
See application file for complete search history.

(56) References Cited

U.S. PATENT DOCUMENTS

| 6,771,250 | B1 | 8/2004 | Oh |
| 8,689,123 | B2 | 4/2014 | Zaman et al. |
| 2002/0107009 | A1 | 8/2002 | Kraft et al. |
| 2008/0250342 | A1* | 10/2008 | Clark ................ G06F 17/30864 715/771 |
| 2009/0170552 | A1* | 7/2009 | Lin .................... H04M 1/72569 455/550.1 |
| 2010/0138416 | A1 | 6/2010 | Bellotti |

(Continued)

FOREIGN PATENT DOCUMENTS

| CN | 1938709 A | 3/2007 |
| CN | 102308272 | 1/2012 |

(Continued)

*Primary Examiner* — Pierre Vital
*Assistant Examiner* — Andrew N Ho
(74) *Attorney, Agent, or Firm* — ScienBiziP, P.C.

(57) ABSTRACT

In multimedia equipment and method for operation of a multimedia situation, a trigger event and a current time that an input device awakens multimedia equipment are detected. A matching situation is searched from a situation database according to the trigger event and the current time that are detected. A thumbnail of the matching situation from the situation database is acquired and displayed. A user operation of the displayed thumbnail of the matching situation is detected. A showing state of an application corresponding to the matching situation from the situation database is acquired. The application is shown according to the acquired showing state when the displayed thumbnail is selected. The disclosure can switch a situation automatically and start a corresponding application on condition that the multimedia equipment is awakened.

7 Claims, 3 Drawing Sheets

(56) References Cited

U.S. PATENT DOCUMENTS

| | | |
|---|---|---|
| 2012/0007713 A1 | 1/2012 | Nasiri et al. |
| 2012/0115501 A1 | 5/2012 | Zheng |
| 2012/0185419 A1 | 7/2012 | Kuhn et al. |
| 2013/0145024 A1 | 6/2013 | Cao et al. |
| 2014/0115509 A1* | 4/2014 | Deng .................. G06F 9/4443 |
| | | 715/764 |

FOREIGN PATENT DOCUMENTS

| | | |
|---|---|---|
| CN | 103221948 A | 7/2013 |
| CN | 103262511 A | 8/2013 |
| CN | 103404118 A | 11/2013 |
| TW | 200521854 | 7/2005 |
| TW | 201212561 A1 | 3/2012 |

\* cited by examiner

MULTIMEDIA EQUIPMENT AND METHOD FOR HANDLING MULTIMEDIA SITUATION

CROSS-REFERENCE TO RELATED APPLICATIONS

This application claims priority to Taiwanese Patent Application No. 103129362 filed on Aug. 26, 2014, the contents of which are incorporated by reference herein.

FIELD

The subject matter herein generally relates to multimedia technology.

BACKGROUND

In an education cloud platform, multiple applications are used for different situations. According to the used situations, the applications are also matched with different control devices, such as a USB keyboard, a USB mouse, a digital white board, a BLUETOOTH presenter, an infrared remote controller, a WIFI feedback device, a microphone and so on. However, multimedia equipment must be manually set to a situation when it is awakened from sleep mode.

BRIEF DESCRIPTION OF THE DRAWINGS

Implementations of the present technology will now be described, by way of example only, with reference to the attached figures, wherein.

DETAILED DESCRIPTION

Figure 1:
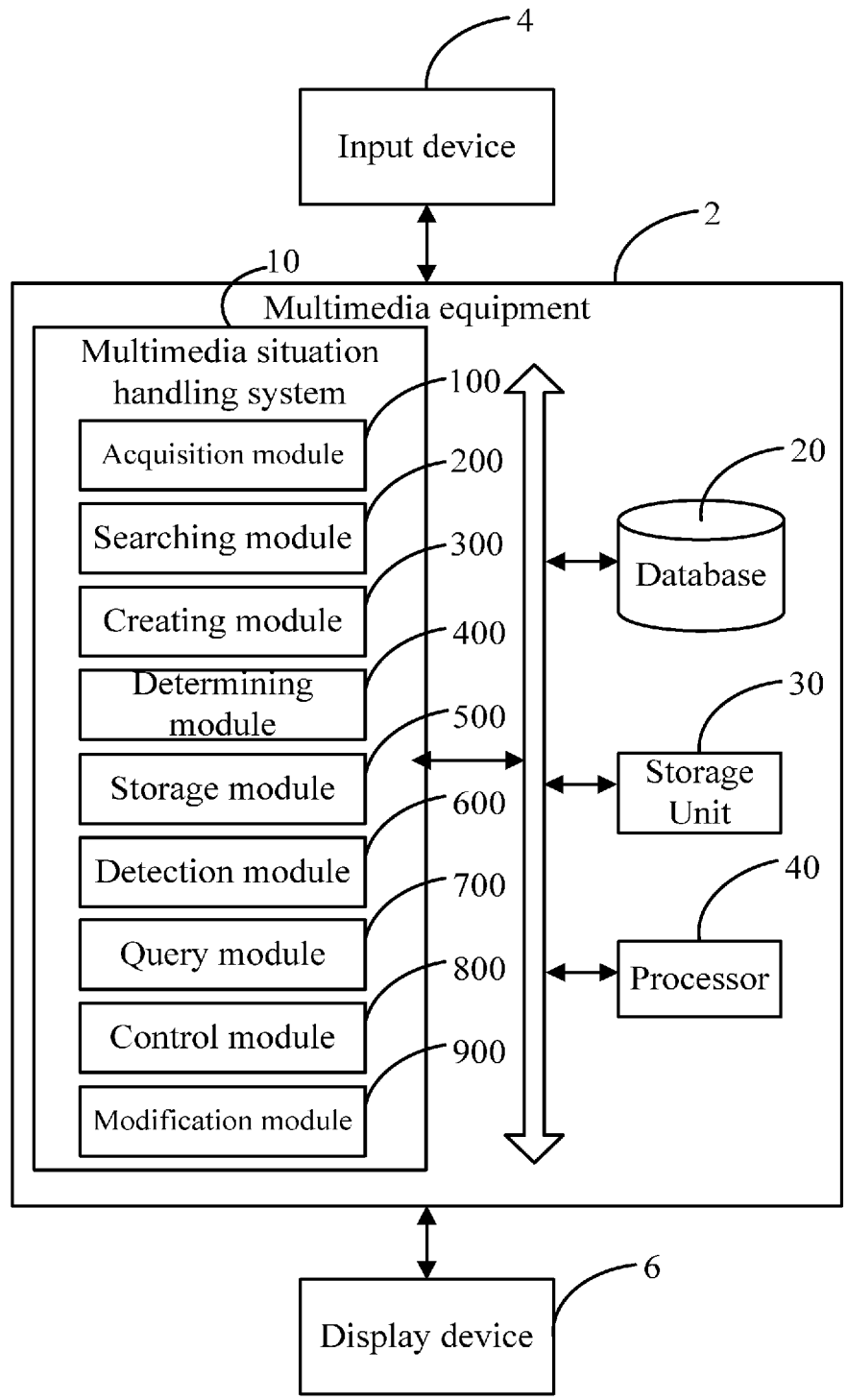
FIG. 1 illustrates a block diagram of an embodiment of multimedia equipment including a multimedia situation handling system and function modules of the multimedia situation handling system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one."

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series and the like.

FIG. 1 illustrates a block diagram of an embodiment of multimedia equipment. In the embodiment, the multimedia equipment 2 includes a multimedia situation handling system 10, a database 20, a storage unit 30, and a processor 40. The multimedia equipment 2 is electronically connected to at least one input device 4 and at least one display device 6. In the embodiment, the input device 4 may be a keyboard, a mouse, a digital white board, a BLUETOOTH presenter, an infrared remote controller, a WIFI feedback device, a microphone and so on. The device 6 displays a multimedia situation and a corresponding application.

FIG. 1 illustrates in one embodiment, the multimedia situation handling system 10 includes an acquisition module 100, a searching module 200, a creating module 300, a determining module 400, a storage module 500, a detection module 600, a query module 700, a control module 800, and a modification module 900. Descriptions of the functions of the modules 100-900 are given with reference to FIG. 2.

The multimedia situation handling system 10 regularly updates the situations existing in a situation database or creates a new situation according to a trigger state of the input device 4, a display state of applications and other characteristic data while the multimedia equipment 2 is working, and searches a matching situation for a user to select from the situation database and starts the applications corresponding to the situations the user selects according to a trigger event of the input device 4 and the current time while the multimedia equipment 2 is awakened from sleep state. The database 20, comprising a characteristic database, a template database and a situation database, saves an acquired characteristic data, a presupposed situation template, a newly created situation and so on.

In the embodiment, the multimedia situation handling system 10 is mainly applied for an education cloud platform, and the situations are the interfaces corresponding to kinds of different multimedia subjects. In other embodiments, the multimedia situation handling system 10 can also be applied in a game platform, a family entertainment platform and so on.

The multimedia situation handling system 10 includes an acquisition module 100, a searching module 200, a creating module 300, a determining module 400, a storage module 500, a detection module 600, a query module 700, a control module 800 and a modification module 900. The one or more function modules can include computerized code in the form of one or more programs that are stored in the storage unit 30, and executed by the processor 40 to provide functions of the multimedia situation handling system 10.

The acquisition module 100 regularly acquires characteristic data that contains the trigger state of each input device 4 and the display state of applications and the current time while the multimedia equipment is working, saves the characteristic data in characteristic database of database 20 and cuts off the current desktop screenshot from the display device 6. In the embodiment, the trigger state refers to which input device 4 is triggered; the display state refers to which application on the display device 6 is displayed in a foreground display, full window display and so on.

The searching module 200 searches for a similar situation template from a template database of the multimedia equipment according to the characteristic data and the current time acquired. In the embodiments, the template database contains various presupposed situation templates corresponding to presupposed characteristic data and time, such as a Chinese lesson situation template, a mathematics lesson situation template, an English lesson situation template and so on. The time is showed in the way of weekday plus time interval, for example, 10:00-12:00 on Monday.

The searching module 200 also compares the characteristic data and the current time acquired by the acquisition module 100 with each situation template of the template database, while the characteristic data acquired is the same as the characteristic data corresponding to a situation template, and the current time acquired belongs to the time periods corresponding to the situation template, then the situation template is the similar situation template.

The creating module 300 creates a temporary reference situation according to the similar situation template and the current desktop screenshot, regards the characteristic data and the current time corresponding to the similar situation template as the characteristic data and the current time corresponding to the temporary reference situation, the current desktop screenshot as a thumbnail of the temporary reference situation. For example, while the similar situation template searched by the searching module 200 is a Chinese lesson situation template, the creating module 300 creates a Chinese lesson temporary reference situation, then the characteristic data and the time corresponding to the Chinese lesson situation template will be regarded as the characteristic data and the current time corresponding to the Chinese lesson temporary reference situation, and the current desktop screenshot will be regarded as the thumbnail of the Chinese lesson temporary reference situation.

The determining module 400 estimates if a same situation with the temporary reference situation exists in the situation database or not. In the embodiment, the determining module 400 also compares the characteristic data and the current time acquired with each situation template of the template database, while the characteristic data acquired is the same as the characteristic data corresponding to a situation template, then the situation template is the similar situation template.

The storage module 500 updates the thumbnail of the temporary reference situation into the same situation of the situation database while a same situation with the temporary reference situation exists in the situation database, otherwise, stores the temporary reference situation as a new situation in situation database, and correspondingly stores the thumbnail of the temporary reference situation and corresponding characteristic data and the current time.

The detection module 600 detects the trigger event and the current time that the input device 4 awakens the multimedia equipment 2 from sleep mode, also the operation of the user on the thumbnail of a display situation, such as cancel, delete or select is detected.

The query module 700 searches for matching situations from the situation database according to a trigger event and the current time that are detected. In the embodiments, query module 700 compares the trigger event and the current time that are detected with the trigger state and time of input device corresponding to each situation stored in the situation database, calculates a matching value, and searches for several situations with high matching value as a matching situation. The calculated matching value between each situation and the trigger event and the current time that are detected will be correspondingly saved in each situation of the situation database. For example, the trigger event detected by the detection module 600 is triggering an infrared remote controller, and the current time is 10:00 on Monday, while the characteristic data corresponding to a Chinese lesson situation stored in the situation database includes an infrared remote controller, the corresponding time interval is 10:00-12:00 on Monday, so the Chinese lesson situation is the matching situation.

In the embodiment, the control module 800 acquires a thumbnail of the matching situations from the situation database and controls the display device 6 to display a thumbnail of several situations with high matching value for users to select, meanwhile a countdown is set. In the process of timing, if the detection module 600 detects that a user does not operate a thumbnail of each situation, the thumbnail of a situation with the highest matching value is to be selected.

The control module 800 acquires a showing state of an application corresponding to a matching situation from the situation database and controls the display device 6 to display the application according to the acquired showing state when the thumbnail is selected. For example, if the display state of an application corresponding to the situation is a Chinese lesson power point (PPT) displayed in full window, the control module 800 will control the display device 6 to start the Chinese lesson PPT and display the Chinese lesson PPT in a full window.

The modification module 900 reduces the matching value between the matching situation and the trigger event and the current time that are detected while detecting that the thumbnail of matching situation is cancelled; deletes the matching situation and related data while detecting that the thumbnail of the matching situation is deleted; increases the matching value between the matching situation and the trigger event and the current time that are detected while detecting that the thumbnail of the matching situation is selected;

In the embodiments, the method for handling multimedia situation includes two parts, a situation storage process and a situation awakening process. The situation storage process regularly updates the situation existing in a situation database or creates a new situation according to the trigger state of the input device 4, and the display state of applications and other characteristic data while the multimedia equipment 2 is working. The situation awakening process searches a matching situation for a user to select from the situation database and starts the application corresponding to the situation the user selects according to the trigger event of the input device 4 and the current time while the multimedia equipment 2 is awakened from sleep state.

Figure 2:
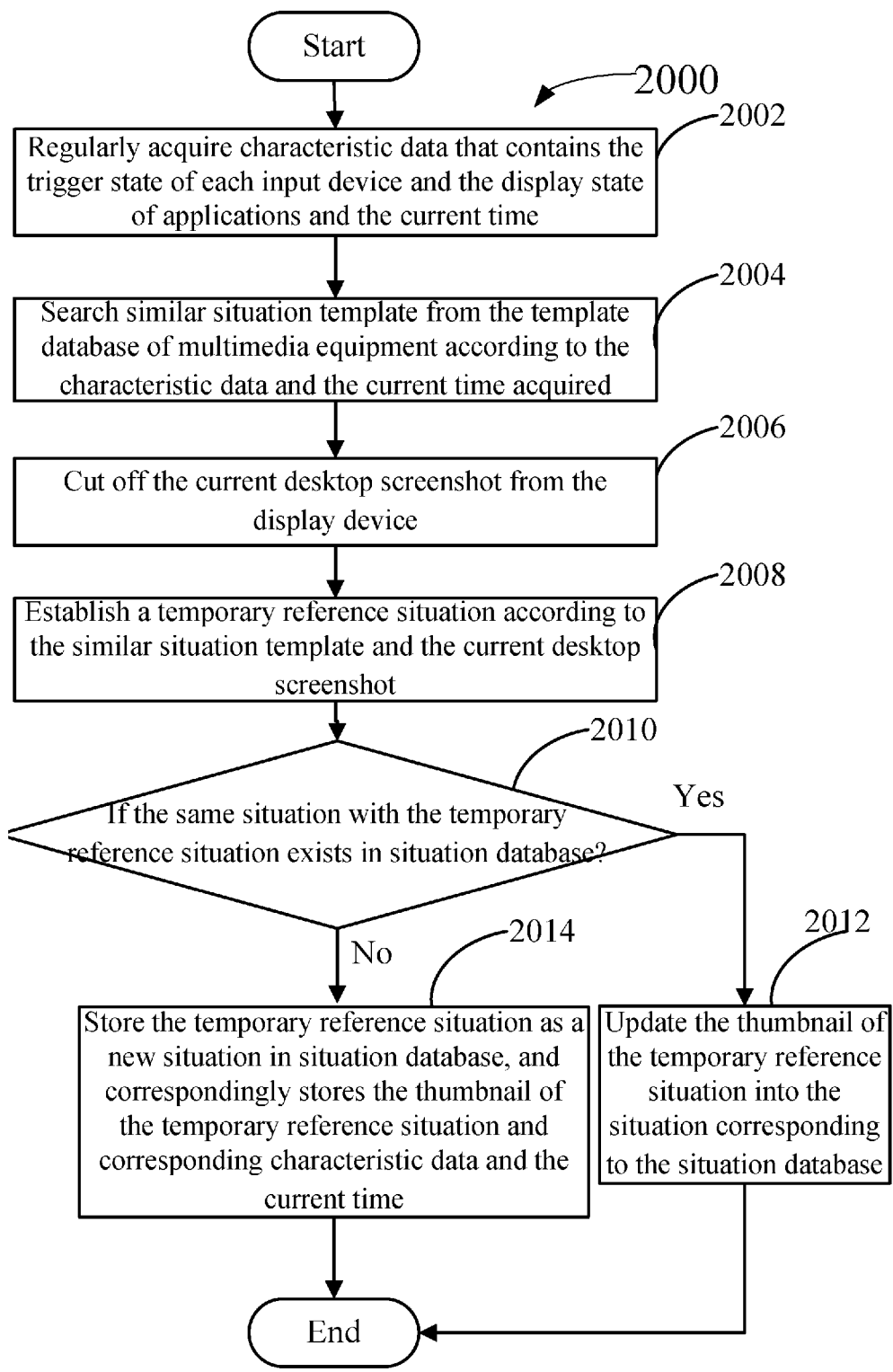
FIG. 2 illustrates a flowchart of an embodiment of a method for realizing a situation storage process.

Referring to FIG. 2, a flowchart is presented in accordance with an example embodiment of a method 2000 to realize the situation storage process, and the function modules 100-500 as FIG. 1 illustrates are executed by the processor 40 to realize the process. The method 2000 is provided by way of example, as there are a variety of ways to carry out the method. The method 2000 described below can be carried out using the configurations illustrated in FIG. 2, for example, and various elements of these figures are referenced in explaining the method 2000. Each block shown in FIG. 2 represents one or more processes, methods, or subroutines, carried out in the exemplary method 2000. Additionally, the illustrated order of blocks is by example only and the order of the blocks can change. The method 2000 can begin at block 2002.

At block 2002, the acquisition module 100 regularly acquires characteristic data that contains the trigger state of each input device 4 and the display state of applications and the current time. In the embodiment, the trigger state refers to which input device 4 is triggered; the display state refers to which application is displayed in foreground display, or full window display on the display device 6. The acquisition module 100 saves the characteristic data acquired in the characteristic database of the database 20.

At block 2004, the searching module 200 searches for a similar situation template from the template database of the multimedia equipment according to the characteristic data and the current time acquired, and compares the characteristic data and the current time acquired by the acquisition module 100 with each situation template of the template database, while the characteristic data acquired is the same as the characteristic data corresponding to a situation template, and the current time acquired belongs to the time periods corresponding to the situation template, then the situation template is the similar situation template.

At block 2006, the acquisition module 100 cuts off the current desktop screenshot from the display device 6.

At block 2008, the creating module 300 creates a temporary reference situation according to the similar situation template and the current desktop screenshot. In the embodiment, the creating module 300 regards the characteristic data and the current time corresponding to the similar situation template as the characteristic data and the current time corresponding to the temporary reference situation, the current desktop screenshot as the thumbnail of the temporary reference situation.

At block 2010, the determining module 400 estimates if the same situation with the temporary reference situation exists in the situation database. In the embodiment, the determining module 400 compares the characteristic data and the current time corresponding to the temporary reference situation with each situation template of the template database, on condition that the characteristic data and the current time corresponding to an existing situation is the same as the characteristic data and the current time corresponding to the temporary reference situation. If the same situation with the temporary reference situation exists in the situation database, the block 2012 will be executed. Otherwise, the block 2014 will be executed.

At block 2012, the storage module 500 updates the thumbnail of the temporary reference situation into the situation corresponding to the situation database.

At block 2014, the storage module 100 stores the temporary reference situation as a new situation in the situation database, and correspondingly stores the thumbnail of the temporary reference situation and corresponding characteristic data and the current time.

Figure 3:
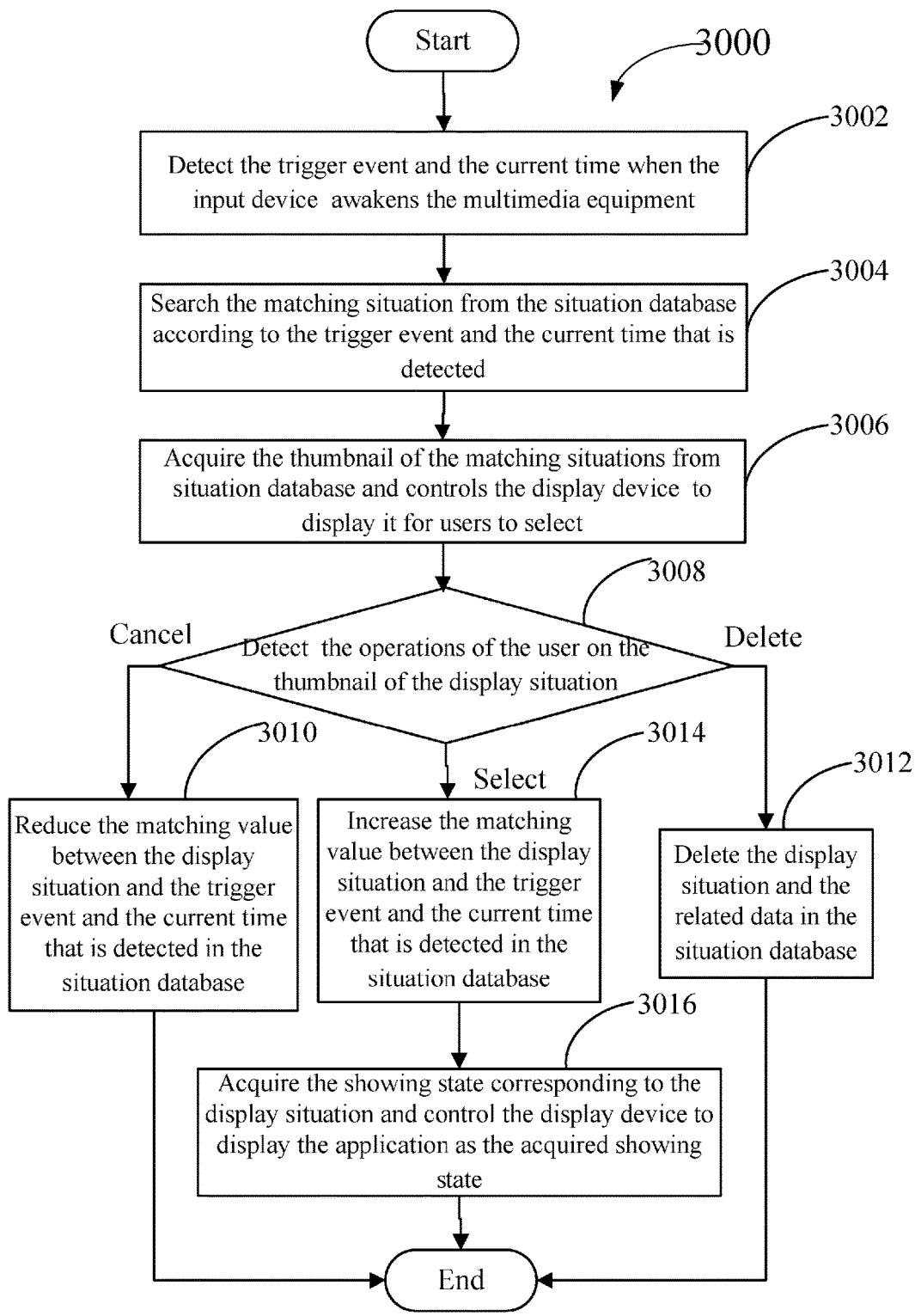
FIG. 3 illustrates a flowchart of an embodiment of a method for realizing a situation awakening process.

Referring to FIG. 3, a flowchart is presented in accordance with an example embodiment of a method 3000 to realize the situation awakening process, and the function modules 600-900 as FIG. 1 illustrates are executed by the processor 40 to realize the process. The method 3000 is provided by way of example, as there are a variety of ways to carry out the method. The method 3000 described below can be carried out using the configurations illustrated in FIG. 2, for example, and various elements of these figures are referenced in explaining the method 3000. Each block shown in FIG. 3 represents one or more processes, methods, or subroutines, carried out in the exemplary method 3000. Additionally, the illustrated order of blocks is by example only and the order of the blocks can change. The method 3000 can begin at block 3002.

At block 3002, the detection module 600 detects the trigger event and the current time when the input device 4 awakens the multimedia equipment 2 from sleep mode.

At block 3004, the query module 700 searches for the matching situation from the situation database according to the trigger event and the current time that are detected by the detection module 600. In the embodiment, the query module 700 compares the trigger event and the current time that are detected with the trigger event and time of the input device corresponding to each situation that is stored in the situation database, calculates a matching value, and searches for several situations with high matching value as the matching situation. The calculated matching value between each situation and the trigger event and the current time that are detected will be saved correspondingly in each situation of the situation database.

At block 3006, the control module 800 acquires a thumbnail of the matching situations from the situation database and controls the display device 6 to display the thumbnail for users to select. In the embodiment, the control module 800 controls the display device 6 to display the thumbnail of several situations with high matching value.

At block 3008, the detection module 600 detects operations of a thumbnail of a display situation, such as cancel, delete or select. The block 3010 will be executed, if detecting that the thumbnail of the display situation is cancelled, the block 3012 will be executed, if the thumbnail of the display situation is deleted, and the block 3014-3016 will be executed, if the thumbnail of the display situation is selected.

At block 3010, the modification module 900 reduces the matching value between the display situation and the trigger event and the current time that are detected in the situation database.

At block 3012, the modification module 900 deletes the display situation and the related data in the situation database.

At block 3014, the modification module 900 increases the matching value between the display situation and the trigger event and the current time that are detected in the situation database.

At block 3016, the control module 800 acquires a showing state corresponding to the display situation and controls the display device 6 to display the application according to the acquired showing state.

The embodiments shown and described above are only examples. Many details are often found in the art such as the other features of a device and method for handing multimedia situation. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method for handling multimedia situations applied for multimedia equipment, multimedia equipment electronically connected to at least one input device and at least one display device, the method comprising:

detecting a trigger event and a current time when the input device awakens the multimedia equipment from a sleep mode;

searching for matching situations from a situation database according to the trigger event and the current time that are detected, wherein the step of searching for the matching situations from the situation database of the multimedia equipment according to the trigger event and current time that are detected comprises:

comparing the trigger event and the current time that are detected with the trigger state and time of the input device corresponding to each situation that is stored in the situation database;

calculating a matching value, searching for several situations with high matching value as the matching situations; and saving the calculated matching value between each situation and the trigger event and the current time that are detected correspondingly in each situation of the situation database;

acquiring a thumbnail of the matching situations from the situation database and displaying on the display device a selectable thumbnail corresponding to the acquired thumbnail;

detecting user operations of the displayed thumbnail;

acquiring a showing state of an application corresponding to the matching situations pertaining to the selected thumbnail from the situation database to show the application according to the acquired showing state when the detected user operation indicates that the displayed thumbnail is selected; and reducing the matching value between the matching situations and the trigger event and the current time that are detected while detecting that the thumbnail of the matching situations is cancelled;

deleting the matching situations and related data while detecting that the thumbnail of the matching situations is deleted;

increasing the matching value between the matching situations and the trigger event and the current time that are detected while detecting that the thumbnail of the matching situations is selected.

2. The method as claimed in claim 1, further comprising:

regularly acquiring characteristic data that contains the trigger state of each input device and the display state of applications and the current time while the multimedia equipment is working;

searching for a similar situation template from a template database of the multimedia equipment according to the characteristic data and the current time acquired;

cutting off a current desktop screenshot from the display device;

establishing a temporary reference situation according to the similar situation template and the current desktop screenshot, regarding the characteristic data and the current time corresponding to the similar situation template as the characteristic data and the current time corresponding to the temporary reference situation, the current desktop screenshot as a thumbnail of the temporary reference situation;

estimating if a same situation with the temporary reference situation exists in the situation database or not;

updating the thumbnail of the temporary reference situation into the same situation of the situation database while the same situation with the temporary reference situation exists in the situation database; otherwise, storing the temporary reference situation as a new situation in the situation database, and correspondingly storing the thumbnail of the temporary reference situation and corresponding characteristic data and the current time.

3. The method as claimed in claim 2, wherein the step of searching for the similar situation template from the template database of the multimedia equipment according to the characteristic data and the current time acquired comprises:

comparing the characteristic data and the current time acquired with each situation template of the template database, while the characteristic data acquired is the same as the characteristic data corresponding to a situation template, and the current time acquired belongs to a time periods corresponding to the situation template, then the situation template is the similar situation template.

4. A multimedia equipment electronically connected to at least one input device and at least one display device, comprising:

at least one processor;

a database;

a storage unit; and one or more programs that are stored in the storage unit and executed by the at least one processor, the one or more programs comprising instructions for:

detecting a trigger event and a current time when the input device awakens the multimedia equipment from a sleep mode;

searching for matching situations from a situation database according to the trigger event and the current time that are detected, wherein the step of searching for the matching situations from the situation database of the multimedia equipment according to the trigger event and current time that are detected comprises:

comparing the trigger event and the current time that are detected with the trigger state and time of the input device corresponding to each situation that is stored in the situation database;

calculating a matching value, searching for several situations with high matching value as the matching situations; and saving the calculated matching value between each situation and the trigger event and the current time that are detected correspondingly in each situation of the situation database;

acquiring a thumbnail of the matching situations from the situation database and displaying on the display device a selectable thumbnail corresponding to the acquired thumbnail;

detecting user operations of the displayed thumbnail;

acquiring a showing state of an application corresponding to the matching situations pertaining to the selected thumbnail from the situation database to show the application according to the acquired showing state when the detected user operation indicates that the displayed thumbnail is selected; and reducing the matching value between the matching situations and the trigger event and the current time that are detected while detecting that the thumbnail of the matching situations is cancelled;

deleting the matching situations and related data while detecting that the thumbnail of the matching situations is deleted;

increasing the matching value between the matching situations and the trigger event and the current time that are detected while detecting that the thumbnail of the matching situations is selected.

5. The multimedia equipment as claimed in claim 4, wherein the one or more programs further comprises instructions for:

regularly acquiring characteristic data that contains a trigger state of each input device and a display state of applications and the current time while the multimedia equipment is working;

cutting off a current desktop screenshot from the display device;

searching for a similar situation template from a template database of the multimedia equipment according to the characteristic data and the current time acquired;

establishing a temporary reference situation according to the similar situation template and the current desktop screenshot;

estimating if a same situation with the temporary reference situation exists in the situation database or not;

updating the thumbnail of the temporary reference situation into the same situation of the situation database while the same situation with the temporary reference situation exists in situation database; otherwise, storing the temporary reference situation as a new situation in situation database; and correspondingly storing the thumbnail of the temporary reference situation and corresponding characteristic data and the current time.

6. The multimedia equipment as claimed in claim 5, wherein the step of searching for a similar situation template from the template database of the multimedia equipment according to the characteristic data and the current time acquired further comprises:

comparing the characteristic data and the current time acquired with each situation template of the template database, while the characteristic data acquired is the same as the characteristic data corresponding to a situation template, and the current time acquired belongs to time periods corresponding to the situation template, then the situation template is the similar situation template.

7. The multimedia equipment as claimed in claim 5, wherein the step of establishing a temporary reference situation according to the similar situation template and the current desktop screenshot comprises:

regarding the characteristic data and the current time corresponding to the similar situation template as the characteristic data and the current time corresponding to the temporary reference situation;

regarding the current desktop screenshot as the thumbnail of the temporary reference situation.

\* \* \* \* \*